Aug. 24, 1937.  H. W. SNYDER  2,090,988
SELF PROPELLED VEHICLE
Filed Sept. 26, 1935
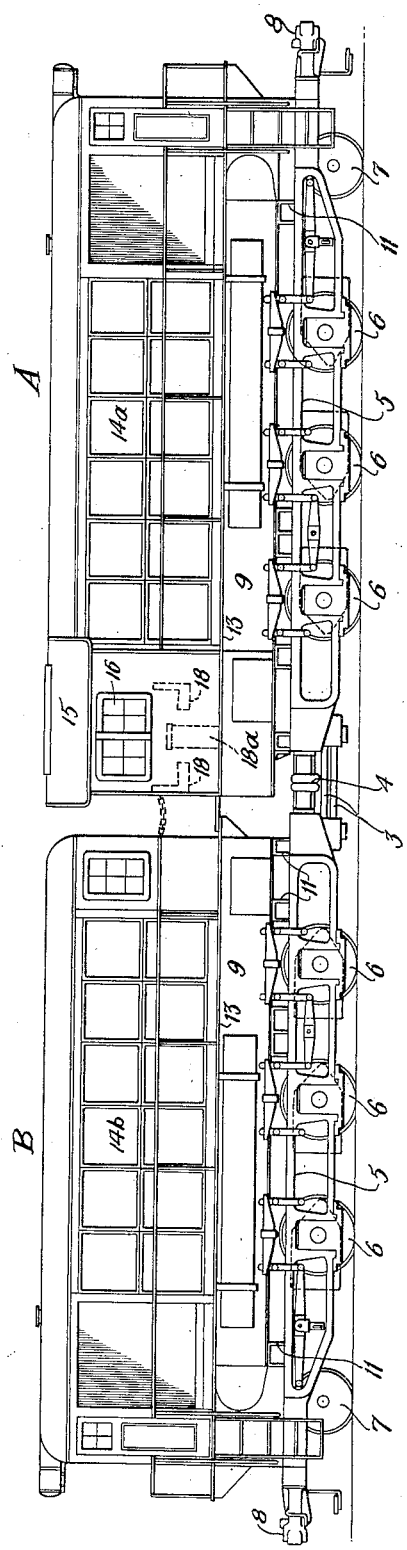
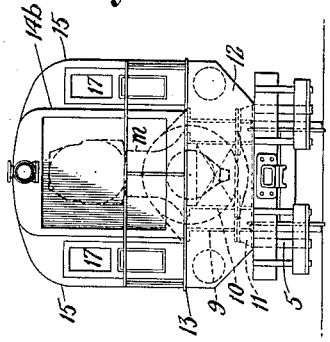
INVENTOR
Herbert W. Snyder
BY
Synnestvedt & Lechner
ATTORNEYS Patented Aug. 24, 1937

2,090,988

UNITED STATES PATENT OFFICE 2,090,988

SELF-PROPELLED VEHICLE

Herbert W. Snyder, Lima, Ohio

Application September 26, 1935, Serial No. 42,245

1 Claim. (Cl. 105—35)

This invention relates to self-propelled vehicles, particularly locomotives, and especially of the Diesel or electric types.

In railway vehicles of this general character, heretofore, it has been customary to mount the machinery, such as engines and/or motors, generators, blowers, and other equipment, within a superstructure extending substantially the full width of and carried by a main frame which is supported either directly upon the driving axles or else upon a couple of power trucks on the frames of which the main frame is pivoted.

In large locomotives, where a considerable number of driving axles must be employed, various difficulties arise in connection with the arrangement of the framing, superstructure and cabs to obtain the necessary flexibility of wheelbase and still maintain general simplicity. Thus, if a very long frame and superstructure be employed, it is in some instances necessary to mount the driving axles in a plurality of groups, each group being journalled in a separate supplemental frame, on which the main frame is pivotally mounted; this resulting in a large overhang of the main frame which is undesirable on curves, and in excessive raising of the main frame and the heavy parts carried thereby, and thus a very high center of gravity, in order to obtain proper clearances for the truck frames with their driving wheels and motors. If the coupler mechanism be mounted directly on the main frame in such construction, it is often necessary to locate the coupler heads well below the plane of the frame, which, under pulling and buffing strains, results in excessive bending forces on said frame; while, on the other hand, if the coupler mechanism be mounted on the sub-frames, and the pull and buff carried through the main frame, the pulling and buffing strains must be transferred to the main frame through the truck center-pins.

It has been attempted to overcome some of these difficulties by dividing the main frame and superstructure itself into a plurality of units, and mounting a plurality of driving axles in each unit thereof.

With such arrangements, however, and the numerous variations thereof, it has been the practice, because of the normally double-ended operation, to locate a control cab, with full equipment, at each end of the vehicle or one upon each unit of the multi-unit type, or even to locate a control cab at each end of each unit, where independent operation of the units was desired.

According to the present invention, the locomotive is composed of a plurality of coupled power-units, each of which comprises a main frame journaling a plurality of driving axles, the several frames being articulated together, with the articulation as well as the end couplers located in the general plane of said framing. The machinery is mounted on the main frame of each unit and housed by a superstructure which has a small dimension in the transverse plane. Preferably the machinery is mounted close to the central longitudinal plane, so that the lateral dimension of the superstructure may be the reduced dimension. Thus the superstructure is considerably narrower than the overall width of the vehicle. A single main control cab is arranged on one only of the units, and extends out substantially the full width of the vehicle, windows being provided at each side thereof, facing in both directions, so that a clear and adequate vision from said cab is available for operation of the entire vehicle in either direction of motion.

Preferably, according to the invention, the vehicle is made up of two units coupled together, with the control cab located at the coupled end of one of the units, so that the longitudinal extension of the superstructure of the whole vehicle, in each direction from said cab, is not of sufficient length to impede proper vision. Such intermediate location of the cab at the same time is a protection to the enginemen in the event of collisions, as at highway crossings.

The invention thus contemplates a minimizing of the amount of control equipment, reduction in cab structure and in cab encroachment upon the available space, and in general a simplification of the locomotive, while at the same time improving the vision in both directions and retaining such advantages as are inherent in the multi-unit articulated-main-frame type.

How these and other objects are obtained by my invention will appear more clearly from consideration of the following description, taken together with the accompanying drawing, in which Figure 1 is a side view of a locomotive embodying my invention, and Figure 2 is an end view thereof.

The locomotive may, for example, be of the Diesel-electric type, and in this embodiment is composed of two power units (indicated in general at A and B), coupled together by the drawbars 3 and having buffing mechanism 4.

Each unit has a main frame 5, spring supported upon a group of three pairs of driving wheels 6, and upon a guiding truck having a pair of wheels 7, the main frame being extended beyond said truck to carry the coupler mechanism indicated at 8. Certain details of the spring rigging are omitted for the sake of clarity, and need not be here described.

The superstructure of each unit may comprise supporting beams 9 and 10 mounted on the main frame proper as by brackets 11, transverse beams or braces 12, a full width decking 13, and a housing (14a in unit A, and 14b in unit B), the housing having a substantially reduced dimension as compared with the overall transverse plane of the vehicle. In this embodiment the lateral dimension is so reduced. As shown, the width of the housing or superstructure proper is about the same as the space between the beams 9, which latter, together with the beams 10, serve to support the heavy machinery. The machinery may extend vertically from about the level of the top of the main frame 5 upwards to the top of the housing, but is confined in its transverse dimensions to the width of the superstructure housing, all as indicated by the dotted outline m (Fig. 2).

This leaves a clear deck along each side of each of the two units, except for the main control cab 15, which as shown is mounted on unit A. This cab extends laterally outwardly (as shown in Figure 2) substantially beyond the width of the main housing or superstructure 14a of said unit and 14b of unit B. In addition to the side windows 16, the control cab is preferably provided with a pair of windows 17 at each side of the vehicle, one facing in each direction. The controls may be located at one side of the cab, in position to be operated from either of the seats 18, as indicated at 18a; or if control from either side of the cab is desired, such control elements as must be directly handled may be duplicated at the two sides.

It will now be evident that by this arrangement I have retained the advantages of wheelbase flexibility and direct-line pull-and-buff connections by articulating the main frames, and the advantages of keeping down the center of gravity and minimizing overhang of the superstructure by making the same in a plurality of units mounted directly on and substantially coextensive with the divisions of the main frame, while at the same time I have simplified the locomotive by employing only a single main control cab, and by the relative disposition of such cab and of the superstructure and machinery of the two coupled units have maintained a wide range of vision from said cab for either direction of operation. These and other advantages will be apparent to those skilled in the art.

I claim:—

A self-propelled vehicle comprising a plurality of coupled wheel-supported frames, an individual power plant carried by each frame for driving the wheels thereof separately from the wheels of the other frame, individual superstructures for supporting and housing the power plants each mounted fixedly on one such frame, on one only of said coupled frames a control cab located in the mid-region of the vehicle, longitudinally considered, and of substantially greater width than the width of said superstructures at the cab level, whereby adequate vision from said control cab for operating the vehicle in both directions is provided and at the same time the frames and superstructures serve as collision protection to the enginemen, and control mechanism for both of said plants associated with opposed cab seats in said single cab for operation of the vehicle in both directions.

HERBERT W. SNYDER.